United States Patent
Luc et al.

(10) Patent No.: US 7,600,077 B2
(45) Date of Patent: Oct. 6, 2009

(54) CACHE CIRCUITRY, DATA PROCESSING APPARATUS AND METHOD FOR HANDLING WRITE ACCESS REQUESTS

(75) Inventors: Philippe Luc, Nice (FR); Florent Begon, Antibes (FR); Elodie Charra, Antibes (FR); Nicolas Chaussade, Mouans-Sartoux (FR)

(73) Assignee: ARM Limited, Cambridge (GB)

( * ) Notice: Subject to any disclaimer, the term of this patent is extended or adjusted under 35 U.S.C. 154(b) by 437 days.

(21) Appl. No.: 11/651,620

(22) Filed: Jan. 10, 2007

(65) Prior Publication Data

US 2008/0168233 A1    Jul. 10, 2008

(51) Int. Cl.
G06F 13/00    (2006.01)
(52) U.S. Cl. ...................................... 711/133
(58) Field of Classification Search ............... 711/130, 711/133, 145, 154
See application file for complete search history.

(56) References Cited

U.S. PATENT DOCUMENTS

| | | | | |
|---|---|---|---|---|
| 2006/0143384 A1* | 6/2006 | Hughes et al. | ............... | 711/130 |
| 2006/0174062 A1* | 8/2006 | Bockhaus | .................... | 711/118 |

* cited by examiner

Primary Examiner—Reba I Elmore
(74) Attorney, Agent, or Firm—Nixon & Vanderhye P.C.

(57) ABSTRACT

Cache circuitry, a data processing apparatus including such cache circuitry, and a method of handling write requests within cache circuitry, are provided. The cache circuitry has a plurality of slots, with each slot arranged to store attributes associated with a pending access request. A record of identifiers that are available to associate with pending access requests is maintained, and control circuitry is responsive to an access request issued by a device to accept that access request as a pending access request by allocating one of the slots to that access request, obtaining one of said identifiers from the record to associate with that access request, and causing the attributes associated with that access request to be stored in the allocated slot along with the obtained identifier. A check procedure is performed to determine, for each pending access request, whether that access request is allowed to proceed. For a speculative pending write access request that is determined to be allowed to proceed, the attributes associated with that access request and the identifier associated with that access request are transferred from the allocated slot to a write entry within a write access buffer, after which the allocated slot is freed for allocation to a subsequent access request. When a speculative confirmed signal is then received from the device specifying that identifier, the write access buffer outputs the attributes from the write entry to store circuitry used to complete the access request. This provides a very efficient mechanism for handling speculative write accesses within a cache.

14 Claims, 6 Drawing Sheets

CACHE CIRCUITRY, DATA PROCESSING APPARATUS AND METHOD FOR HANDLING WRITE ACCESS REQUESTS

BACKGROUND OF THE INVENTION

1. Field of the Invention

The present invention relates to cache circuitry, a data processing apparatus including such cache circuitry, and a method for handling write access requests within such cache circuitry.

2. Description of the Prior Art

A data processing apparatus will typically include one or more data processing units which are operable to perform data processing operations on data values stored in memory. Since accesses to memory are relatively slow, and hence are likely to adversely impact the performance of the processing unit, it is known to provide one or more caches within the data processing apparatus for storing a subset of the data values so that they can be made available to the processing unit more quickly than if instead they had to be accessed directly in memory.

When a processing unit wishes to access a data value, it will typically issue an access request specifying an address in memory of the data value required to be accessed. Assuming the address specified by the access request corresponds to a cacheable memory region, a cache receiving that access request will typically be arranged to perform a lookup procedure to determine from the specified address, or at least from a portion thereof, whether the data value the subject of the access request is stored within one of the cache lines of the cache (this being referred to as a hit condition), and if so to allow the data value to be accessed in the cache. For a write access, this will involve updating the relevant data value within the identified cache line, whereas for a read access this will involve returning to the processing unit the data value as read from the identified cache line.

If on receipt of an access request, the cache determines that the data value the subject of the access request is not present in the cache (referred to as a miss condition), then the cache may be arranged to perform a linefill operation in order to retrieve into the cache a cache line's worth of data from memory, including the data value the subject of the access request, so that the data value can then be accessed directly from the cache. As part of such a linefill procedure, it will be necessary to select a cache line in which this new content is to be stored. If that selected cache line is currently storing data relating to a write through region of memory, any updates to that cache line's data will have been also made to memory, and accordingly there is no need to output the current contents of that cache line to memory before overwriting it with the new content retrieved as part of the linefill procedure. However, if the current contents of that cache line relate to a write back region of memory, it will additionally be necessary as part of the linefill procedure to evict the current cache line's contents to memory to ensure that memory is updated to reflect any changes that have been made to the current content of the cache line.

Typically, a cache will have control circuitry arranged to receive each access request issued by the processing unit and to process that access request as outlined above. Often, a number of slots are provided within the control circuitry to allow a number of access requests to be pending at any particular point in time. In particular, each slot is arranged to store attributes associated with a pending access request. Before the above-mentioned lookup procedure is performed in respect of the cache, a number of checks need to be performed to ensure that the access specified by the access request is allowed to proceed. For example, certain areas of memory may only be accessible by the processing unit when operating in a particular mode of operation. Details of each pending access request will typically be kept within the allocated slot for that access request while such checks are performed. Since such checks typically take several clock cycles, the provision of multiple slots can allow an access request to be received by the cache circuitry per clock cycle.

However, it is desirable to keep the number of slots provided small, since as each additional slot is added, the complexity of the control circuitry increases. For example, each slot will require associated circuitry to perform the above mentioned check procedures in relation to the contents of that slot, and will need additional circuitry to handle other aspects of the associated access request, for example constructing burst accesses in the event that the access request is a burst access request specifying multiple accesses. Further, hazard detection circuitry within the control circuitry becomes more complex the more slots there are within the cache, since that circuitry needs to be able to check the contents of all of the slots to ensure that hazards such as read after write hazards are prevented. Further, arbitration circuitry required to arbitrate between independent requests made by the various slots for use of cache resources also becomes more complex the more slots are provided.

In emerging processor designs, use of speculative accesses is becoming more common. Such speculative accesses can include speculative write accesses. A speculative write access request cannot be committed to the memory system until the processor subsequently confirms whether that speculative access should proceed or should fail, and hence the data cannot be stored in the cache array of the data cache and/or output to lower levels of the memory system until a signal has been received from the processing unit confirming that that speculative write access should occur. Accordingly, when a speculative write access request is allocated to one of the slots, it is likely to need to stay within that slot for a longer period of time than a standard write access request or a read access request would require. This will adversely affect the ability of the cache to receive subsequent access requests from the processing unit, which will in turn adversely affect the performance of the processing unit.

One way to seek to address this would be to add additional slots to the control circuitry of the cache. However, for the above mentioned reasons, this is undesirable due to the increase in complexity that results from each additional slot added. This additional complexity can lead to timing issues, for example due to the need to provide larger arbitration circuitry in respect of other resources within the cache such as a bus interface unit, a store buffer, etc.

One known mechanism for seeking to increase the number of write access requests that can be retained for subsequent processing without adversely impacting the performance of the processing unit is to provide a store queue on a path between the processing unit and the cache. Such a store queue typically acts as a first-in-first-out (FIFO) buffer to allow write access requests issued by the processing unit to be temporarily buffered prior to forwarding to the slots within the control circuitry of the cache. However, the use of such a store queue introduces additional complexity issues, particularly in respect of hazard detection. In particular, for a read access request pending in one of the slots of the control circuitry of the cache, an additional interface would need to be provided to enable the contents of the store queue to be analysed to ensure hazards such a read after write hazards were prevented. Additionally, another interface would need to be provided between the processing unit and the store queue to enable write access requests to be forwarded to the store queue rather than directly to the cache.

Accordingly, it would be desirable to provide an improved technique for handling write access requests within a cache, in particular when some of those write access requests may be speculative write access requests.

SUMMARY OF THE INVENTION

Viewed from a first aspect, the present invention provides cache circuitry for use in a data processing apparatus, the cache circuitry comprising: a cache storage comprising a plurality of cache lines for storing data values for access by a device of the data processing apparatus; a plurality of slots, each slot arranged to store attributes associated with a pending access request issued by said device, each pending access request being either a write access request or a read access request; identifier circuitry for maintaining a record of identifiers that are available to associate with pending access requests to uniquely identify each pending access request; control circuitry, responsive to an access request issued by said device, to accept that access request as a pending access request by allocating one of said plurality of slots to that access request, obtaining from the identifier circuitry one of said identifiers to associate with that access request, and causing the attributes associated with that access request to be stored in the allocated slot along with the obtained identifier; the control circuitry being arranged to perform a check procedure to determine, for each pending access request, whether that access request is allowed to proceed; a write access buffer comprising a plurality of write entries; for a speculative pending write access request seeking to write data, the control circuitry being responsive to a determination that that pending access request is allowed to proceed to transfer from the allocated slot to one of said write entries the identifier associated with that access request and at least the attributes associated with that access request that are required to enable the access request to be completed, and to then free the allocated slot for allocation to a subsequent access request; the write access buffer being responsive to a speculative confirmed signal from the device specifying said identifier, to output the attributes from the write entry having that identifier to store circuitry used to complete the access request.

In accordance with the present invention, a plurality of slots are provided for storing attributes associated with pending access requests. In addition, a record of identifiers that are available to associate with pending access requests is maintained, and when the control circuitry accepts an access request as a pending access request, it does so by allocating one of the slots to that access request, obtaining an identifier to associate with that access request from the record, and causing the attributes for that access request to be stored in the allocated slot along with the obtained identifier.

Separately to the plurality of slots, a write access buffer is provided that comprises a plurality of write entries. If a pending write access request is a speculative write access request, and it is determined following performance of a check procedure that that speculative write access request is allowed to proceed (i.e. does not violate any access permission rights applicable to the memory address in question), the identifier associated with that access request and at least the attributes of the access request required to enable the access request to complete are forwarded from the allocated slot to an available one of the write entries, at which point the allocated slot is then freed for allocation to a subsequent access request. At this point the write access request is still speculative, since even though it has passed the check procedure, it can only be committed to memory once the device has confirmed that the access request should occur.

Since the same identifier is associated with the write entry as was associated with the allocated slot, the presence of the write access buffer is entirely hidden from the device and instead any subsequent communications between the device and the cache concerning that access request continue to use the same identifier. In particular, when a speculative confirmed signal is subsequently received from the device specifying that identifier, the attributes can be output from the write entry to store circuitry used to complete the access request. Thereafter the write entry can be freed for use in connection with a subsequent speculative pending write access request.

From the point of view of the device interfacing with the cache, no change is required to the operation of that device when interfacing with the cache circuitry of the present invention, other than to increase the number of identifiers that can be used in association with access requests. For every pending access request, one of the slots is used initially to hold that pending access request, and the required check procedure is performed whilst the attributes of that access request are stored within that slot. Thereafter, if the slot is storing attributes related to a speculative write access request, those attributes can be transferred to one of the write entries, and each write entry requires significantly less logic than is associated with each slot, since the check procedure has already been performed, and the write entries are not required to interface with any other components of the cache circuitry other than the store circuitry and the hazard detection circuitry. Accordingly, the approach of the present invention requires significantly less area than would be required if instead the number of slots were increased, and avoids the timing issues that would arise when seeking to multiplex between an increased number of slots. Further, the design and operation of the device coupled to the cache does not need to be altered. Accordingly, speculative write access requests can be handled in an efficient manner, without unnecessarily tying up the resources of the slots.

The attributes of an access request that are stored in the allocated slot can take a variety of forms. However, in one embodiment, for a write access request the attributes that are stored in the allocated slot at the time that access request is accepted as a pending access request comprise at least an address indication identifying a memory address of a data value to be written. Typically, such attributes also include the data value to be written as a result of the write access request, although often that write data is provided several cycles after the address data, and accordingly the attributes may have been transferred to one of the write entries by the time the write data is received by the cache circuitry, in which case that write data is stored within that write entry since at that point the originally allocated slot will have been released for use in association with a subsequent write access request.

In one embodiment, the attributes stored in the allocated slot further comprise access attributes output by a memory access attribute unit of the data processing apparatus, the access attributes being dependent on the memory address specified by the pending access request. The memory access attribute unit may take a variety of forms, and for example may comprise a memory management unit (MMU) or a memory protection unit (MPU). The access attributes can take a variety of forms, but would typically include access permission attributes identifying any access limitations applicable to the memory address specified. For example, some memory addresses may only be written to from particular modes of operation of the device. The access attributes may also include region attributes identifying for example whether accesses to the relevant memory address are bufferable, cacheable, etc.

Hence, in one particular embodiment, the attributes associated with an access request that are stored in the allocated slot, and subsequently in a write entry in the event of a speculative pending write access request, comprise an address attribute, a data attribute, and access attributes specifying access permissions and region attributes. In one embodiment, when performing the check procedure the control circuitry references the access attributes stores in the allocated slot. For a speculative pending write access request that the control circuitry determines is allowed to proceed, the attributes transferred from the allocated slot to the selected write entry may comprise all of the attributes stored in the allocated slot or a subset thereof. For example, in some embodiments, it may not be necessary for some of the access attributes to be forwarded from the allocated slot to the selected write entry, since they may no longer be needed after the check procedure has been performed. However, in one embodiment, all of the attributes stored in the allocated slot are transferred to the selected write entry for such speculative pending write access requests.

As mentioned previously, the write data specified by a write access request may be forwarded to the cache circuitry some clock cycles after the write access request is issued. In one embodiment, following acceptance of a write access request as a pending access request, the control circuitry is responsive to receipt from the device of write data associated with that write access request to determine from the identifier provided with that write data whether the attributes of that pending access request are currently stored in one of said slots or within one of said write entries, and to forward the write data to the relevant slot or write entry for storing therein as one of said attributes.

In one embodiment, for a non-speculative pending write access request, the control circuitry is responsive to a determination that that pending access request is allowed to proceed to output the attributes from the allocated slot to the store circuitry used to complete the access request.

However, in an alternative embodiment, the write entries may be used for both speculative and non-speculative pending write access requests, such that once the control circuitry has determined that a pending write access request is allowed to proceed, the attributes of that pending write access request are transferred from the allocated slot to a selected one of the write entries, thereby freeing the slot for use in connection with a subsequent access request, whether that subsequent access request be another write access request or a read access request.

In some embodiments, the identifiers provided by the identifier circuitry may not be re-used, and instead some form of counter mechanism could be used to generate new identifiers for each pending access request. However, in one embodiment of the present invention, a pool of identifiers is maintained by the identifier circuitry, and in accordance with such embodiments, once the attributes of a pending write access request have been output to the store circuitry, the identifier circuitry is updated to enable the identifier that had been associated with that pending write access request to be associated with a subsequent pending access request. Hence, in such embodiments, the identifier circuitry identifies for each identifier in the pool whether that identifier is currently available, or is currently associated with a pending write access request. When an identifier is no longer required in connection with an access request, the identifier circuitry is updated to mark that identifier as being available.

In one embodiment, the control circuitry is responsive to a speculative failed signal from the device specifying said identifier, to kill the pending write access request associated with that identifier, and to cause the write entry or allocated slot storing the attributes of that pending write access request to be freed for use with a subsequent pending access request.

Further, in one embodiment, responsive to the speculative failed signal the identifier circuitry is updated to enable the identifier that had been associated with that pending write access request to be associated with a subsequent pending access request. Hence, in such embodiments, receipt of the speculative failed signal causes the relevant write access request to be killed, the write entry or allocated slot currently associated with that pending write access request to be freed for use with a subsequent pending access request, and the associated identifier to be released back to the pool of available identifiers to enable it to be associated with a subsequent pending access request.

In one embodiment, if the speculative confirmed signal is received from the device before the attributes of the pending write access request have been transferred from the allocated slot to one of said write entries, the control circuitry is arranged to cause the attributes to be output from the allocated slot to the store circuitry instead of being transferred to the write entry. Hence, in situations where the speculative confirmed signal is received relatively early, the speculative pending write access request is treated as a standard pending write access request, and forwarded directly to the store circuitry instead of being transferred to a write entry of the write access buffer.

Viewed from a second aspect, the present invention provides a data processing apparatus comprising: a processing unit operable to perform data processing operations requiring access to data values stored in memory; cache circuitry operable to store a subset of said data values for access by the processing unit, the cache circuitry comprising: a cache storage comprising a plurality of cache lines for storing said subset of data values; a plurality of slots, each slot arranged to store attributes associated with a pending access request issued by said processing unit, each pending access request being either a write access request or a read access request; identifier circuitry for maintaining a record of identifiers that are available to associate with pending access requests to uniquely identify each pending access request; control circuitry, responsive to an access request issued by said processing unit, to accept that access request as a pending access request by allocating one of said plurality of slots to that access request, obtaining from the identifier circuitry one of said identifiers to associate with that access request, and causing the attributes associated with that access request to be stored in the allocated slot along with the obtained identifier; the control circuitry being arranged to perform a check procedure to determine, for each pending access request, whether that access request is allowed to proceed; a write access buffer comprising a plurality of write entries; for a speculative pending write access request seeking to write data, the control circuitry being responsive to a determination that that pending access request is allowed to proceed to transfer from the allocated slot to one of said write entries the identifier associated with that access request and at least the attributes associated with that access request that are required to enable the access request to be completed, and to then free the allocated slot for allocation to a subsequent access request; the write access buffer being responsive to a speculative confirmed signal from the processing unit specifying said identifier, to output the attributes from the write entry having that identifier to store circuitry used to complete the access request.

The processing unit can take a variety of forms, and hence for example may be a processor core, a digital signal processor (DSP), a hardware accelerator, etc. Indeed, in some embodiments, the processing unit itself may include a level of caching, and the cache logic of the present invention may reside at a lower cache level so that in effect the source of the access request is a cache at a higher level.

Viewed from a third aspect, the present invention provides cache logic for use in a data processing apparatus, the cache logic comprising: cache storage means comprising a plurality of cache lines for storing data values for access by a device of the data processing apparatus; a plurality of slot means, each slot means for storing attributes associated with a pending access request issued by said device, each pending access request being either a write access request or a read access request; identifier means for maintaining a record of identifiers that are available to associate with pending access requests to uniquely identify each pending access request; control means, responsive to an access request issued by said device, for accepting that access request as a pending access request by allocating one of said plurality of slot means to that access request, obtaining from the identifier means one of said identifiers to associate with that access request, and causing the attributes associated with that access request to be stored in the allocated slot means along with the obtained identifier; the control means further for performing a check procedure to determine, for each pending access request, whether that access request is allowed to proceed; a write access buffer means comprising a plurality of write entry means; for a speculative pending write access request seeking to write data, the control means being responsive to a determination that that pending access request is allowed to proceed for transferring from the allocated slot means to one of said write entry means the identifier associated with that access request and at least the attributes associated with that access request that are required to enable the access request to be completed, and to then free the allocated slot means for allocation to a subsequent access request; the write access buffer means being responsive to a speculative confirmed signal from the device specifying said identifier, for outputting the attributes from the write entry means having that identifier to store means used to complete the access request.

Viewed from a fourth aspect, the present invention provides a method of handling write requests within cache circuitry of a data processing apparatus, the cache circuitry having a cache storage comprising a plurality of cache lines for storing data values for access by a device of the data processing apparatus, the method comprising the steps of: maintaining a plurality of slots, each slot arranged to store attributes associated with a pending access request issued by said device, each pending access request being either a write access request or a read access request; maintaining a record of identifiers that are available to associate with pending access requests to uniquely identify each pending access request; responsive to an access request issued by said device, accepting that access request as a pending access request by allocating one of said plurality of slots to that access request, obtaining from said record one of said identifiers to associate with that access request, and storing the attributes associated with that access request in the allocated slot along with the obtained identifier; performing a check procedure to determine, for each pending access request, whether that access request is allowed to proceed; maintaining a write access buffer comprising a plurality of write entries; for a speculative pending write access request seeking to write data, responding to a determination that that pending access request is allowed to proceed by transferring from the allocated slot to one of said write entries the identifier associated with that access request and at least the attributes associated with that access request that are required to enable the access request to be completed, and then freeing the allocated slot for allocation to a subsequent access request; and responsive to a speculative confirmed signal from the device specifying said identifier, outputting the attributes from the write entry having that identifier to store circuitry used to complete the access request.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
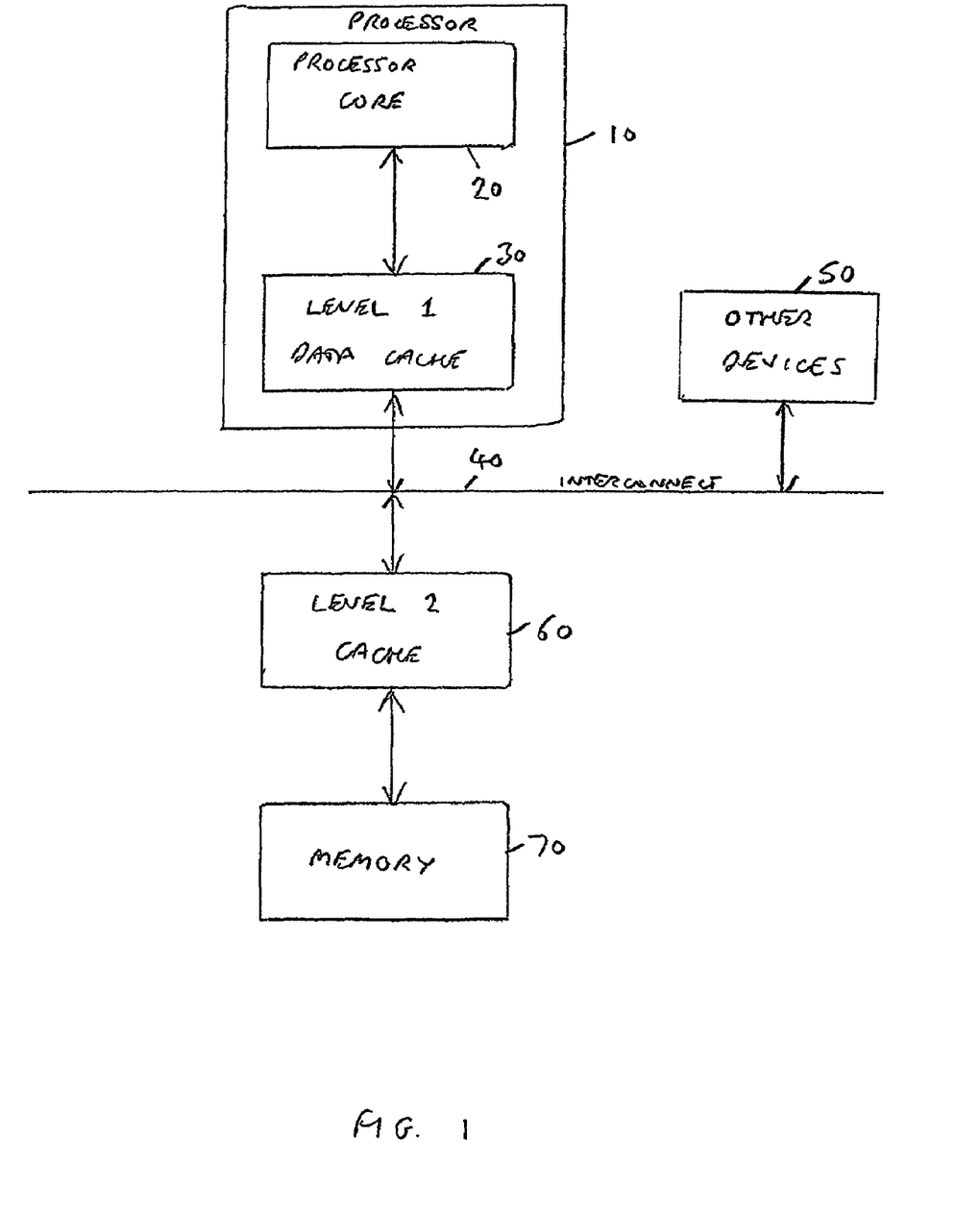
FIG. 1 is a block diagram of a data processing apparatus in accordance with one embodiment of the present invention.

FIG. 1 is a block diagram of a data processing apparatus in accordance with one embodiment of the present invention. As shown in FIG. 1, a processor 10 is provided having a processor core 20 coupled to a level one data cache 30, the data cache 30 being used to store data values for access by the processor core 20 when performing data processing operations. The processor 10 is connected to a bus interconnect 40 via which it can be coupled with other devices 50, and with a memory system, the memory system in this example consisting of a level two cache 60 coupled to memory 70. The other devices 50 can take a variety of forms, and hence can for example be other master devices initiating transactions on the bus interconnect, and/or one or more slave devices used to process transactions issued by master devices on the bus interconnect 40. The processor 10 is an example of a master device, and it will be appreciated that one or more of the other devices 50 may be another processor constructed similarly to processor 10.

When the processor core 20 wishes to access a data value in memory 70, it outputs an access request specifying an address of that data value in memory 70. This access request is received by the level one data cache 30, and assuming the access request pertains to a cacheable region of memory, the level one data cache 30 is arranged to perform a lookup operation in the data cache to determine whether the data value the subject of the access request is present in the cache. If it is, then the data value can be accessed directly in the level one data cache 30 without the need to output a request to memory, thereby significantly saving access time to that data value. Accordingly, if the access request is a read access request, the required data value will be returned from the level one data cache 30 to the processor core 20. If instead the access request is a write access request, then the updated data value output by the processor core 20 can be written into the relevant cache line of the level one data cache 30.

When on performing a lookup operation, it is determined that the data value the subject of the access request is stored within the cache, this is referred to as a cache hit. Conversely, if on performing the lookup operation the data value is not found within the cache, then this is referred to as a cache miss. In the event of a cache miss within the level one data cache 30, the level one data cache will typically output a linefill request to the level two cache 60 via the interconnect 40. This will typically take the form of an access request to the level two cache 60 requesting content from the level two cache 60 sufficient to fill a cache line within the level one data cache, that requested content including the data value initially requested by the processor core 20.

In an analogous manner to that discussed earlier with reference to the level one data cache 30, if the requested content is in the level two cache 60, then it will be returned to the level one data cache 30 (i.e. a hit will occur within the level two cache 60), whereas otherwise a cache miss will be detected, and the level two cache will output a linefill request to memory 70, this linefill request seeking to access data from memory sufficient to fill one of the cache lines in the level two cache, the data requested including the data value initially requested by the processor core 20. Typically, although this is not essential, the cache lines in the level two cache are larger than the cache lines in the level one cache, and accordingly if a hit is detected in the level two cache 60, it will not generally be necessary to output the entire contents of the hit cache line back to the level one data cache 30.

Figure 2:
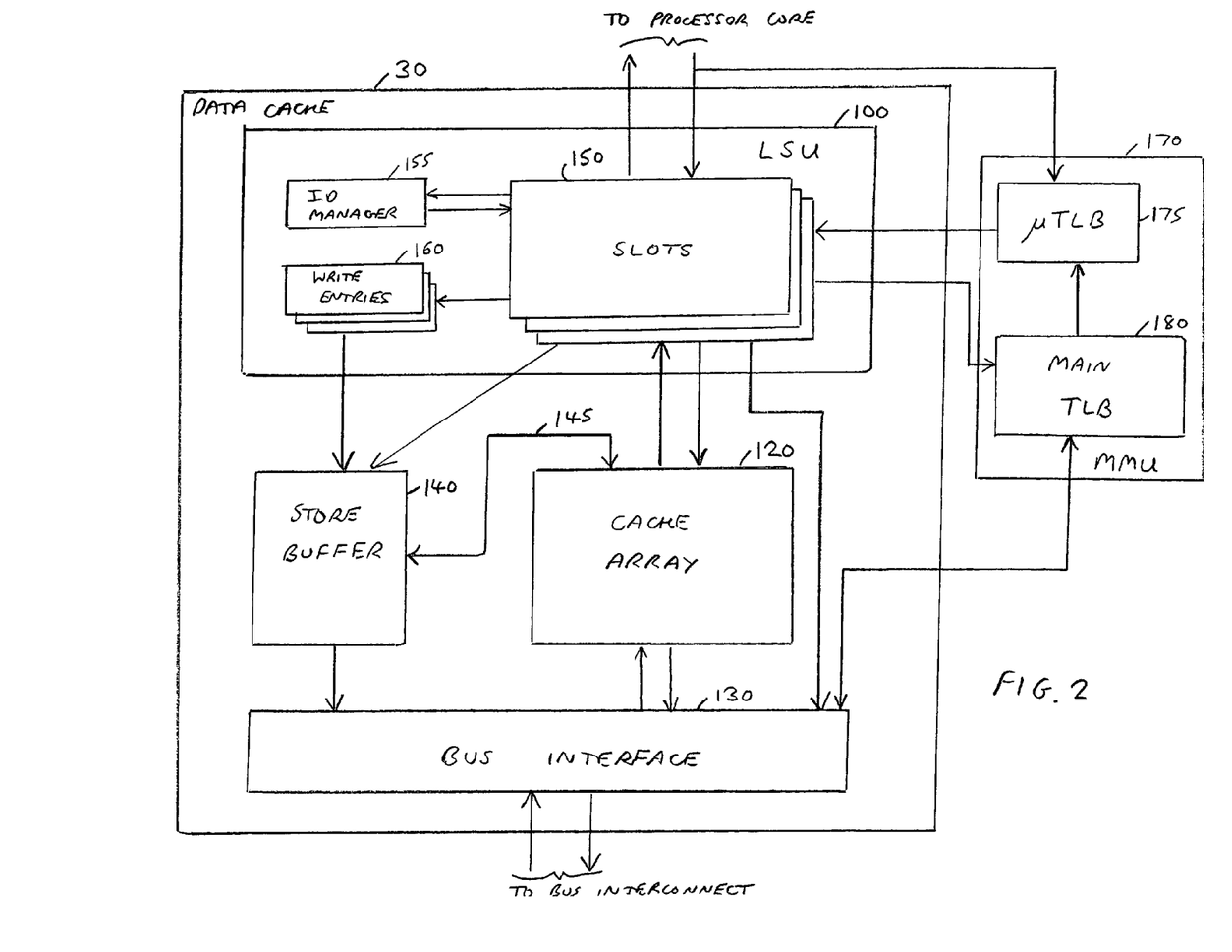
FIG. 2 is a block diagram illustrating components provided within the level one data cache of FIG. 1 in accordance with one embodiment of the present invention.

FIG. 2 is a block diagram illustrating components provided within the data cache 30 illustrated in FIG. 1 in accordance with one embodiment of the present invention. The basic operation of the data cache 30 is as follows. The data cache 30 is coupled via a load/store unit (LSU) 100 with the processor core 20 and is arranged to receive read and write access requests from that processor core. In the event of a read access request, that access request can be forwarded (subject to some initial processing by the LSU described in more detail later) to the cache array 120 to enable a lookup procedure to be performed in order to determine whether the requested data value is in the cache array, if so that data value being routed back via the LSU 100 to the processor core. In the event of a cache miss, a linefill request is forwarded via the bus interface 130 to the bus interconnect logic to cause a cache line's worth of data including the data value of interest to be retrieved from the memory system 60, 70 for storing in the cache array 120, whereafter the required data value is returned via the LSU 100 to the processor core.

For write access requests, these are forwarded (again subject to some initial processing by the LSU described in more detail later) to the store buffer 140 from where they are then processed. In particular, for a cacheable access request, the store buffer may initiate a lookup via path 145 in the cache array 120 to determine whether the data value the subject of the write access request is within the cache array, and if so an update will be performed in the cache line of the cache array 120. In the event of a cache miss, a linefill process will be invoked by the store buffer 140 via the bus interface 130 to cause a cache line's worth of data to be retrieved from the memory system for storing in the cache array, whereafter the write update can take place within the cache array. Alternatively the cache line's worth of data is received from the memory into a linefill buffer located within the bus interface 130, the write update is then merged with that data in the linefill buffer, and thereafter the line of data will be allocated in the cache array 120.

As will be appreciated by those skilled in the art, the store buffer 140 can also be arranged to perform some merging activities with respect to multiple write access requests so as to increase the efficiency of the cache when handling multiple write access requests.

Having described the basic operation of the data cache 30, there will now follow a more detailed discussion of the operation of the LSU 100 within the data cache 30 in accordance with embodiments of the present invention. Within the LSU 100, a number of slots 150 are provided, each slot being able to accept one pending access request, which may be either a read access request or a write access request. The slots 150 are able to communicate with ID management circuitry 155 which maintains a list of available IDs that can be associated with pending access requests. When a new access request is issued from the processor core 20 to the data cache 30, control circuitry within the LSU 100 can accept that access request as a pending access request if there is an available slot 150 for that access request. Assuming there is an available slot, then the ID management circuitry 155 is contacted to obtain an available ID that can be used in association with that access request, and an indication of that ID is returned to the processor core so that when the processor core subsequently communicates with the data cache concerning that pending access request, that ID will be used in order to identify the access request being referred to. The initial access request issued by the processor core will typically include certain control information and an address indication identifying the memory address to which the access request relates, and this attribute information is stored within the allocated slot along with the ID provided with the ID management circuitry 155.

As each access request is issued by the processor core, the address indication provided by that access request is routed to a micro table lookaside buffer (µ-TLB) 175 within an MMU 170. Within memory, one or more page tables are maintained, and each page table provides a number of descriptors, each descriptor being associated with a particular memory region. Each descriptor typically identifies for that memory region a virtual to physical address translation, access permissions associated with that memory region, for example identifying from which modes of operation the processor can access that region, and region attributes identifying for example whether accesses to that memory region are cacheable, bufferable, etc. A number of the descriptors are retrieved via the bus interface 130 into the main TLB 180 of the MMU, from where a subset of those descriptors can be provided to the µ-TLB 175.

If, for an access request accepted into one of the slots 150 as a pending access request, the associated address hits in the µ-TLB 175, the access permissions and region attributes will be forwarded from the µ-TLB 175 for storing as access attributes within the relevant slot 150. Additionally, the physical address determined by the virtual to physical address translation identified in the relevant µ-TLB entry will also be forwarded for storing in the slot 150. Typically, an indication of the virtual address is also stored within the slot 150. If a hit is not detected in the P-TLB, then in one embodiment this miss information will be forwarded to the relevant slot 150, and thereafter associated control circuitry in the LSU 100 will contact the main TLB 180 to cause the required descriptor to be forwarded to the µ-TLB 175 to enable the relevant access permissions, region attributes and physical address information to be forwarded to the slot 150 for storage therein. This process may involve the main TLB 180 needing to access memory through the bus interface 130 to retrieve the required descriptor.

In accordance with embodiments of the present invention, the processor core 20 is able to issue speculative write access requests which cannot be committed to the memory until subsequently the processor core either confirms that that speculative write access request should in fact proceed, or alternatively the processor core identifies that that access request should fail, and accordingly should be killed without being committed to the memory system. To avoid such a speculative write access request needing to reside in the slot 150 until either the confirmed or failed signal is received from the processor core, the LSU 100 of embodiments of the present invention provides a write access buffer consisting of a number of write entries 160 to which speculative write access requests can be forwarded once some initial checks have been undertaken. In particular, for any access request received into one of the slots 150, control circuitry within the LSU 100 performs a number of check operations with reference to the information obtained from the μ-TLB 175 in order to determine whether that write access is allowed. If not, the write access is aborted and an abort procedure is followed resulting in the relevant slot being freed and the ID associated with that slot being released by the ID management circuitry 155 for use with subsequent access requests.

For a non-speculative access request, once such checks have been performed, the access request can then proceed with respect to the memory system (assuming it passes the checks). For a cacheable read access request, this means that a lookup can be performed in the cache array 120 to determine whether the data value the subject of the read access request is stored within the cache array, and if so the required data can be returned to the processor core. In the event of a cache miss, a linefill process will be performed as described earlier to retrieve the required data.

Similarly, for a non-speculative write access request, then assuming the above check procedures identify that that access request is allowed to proceed, the write access request can be forwarded from the relevant slot to the store buffer 140 which then operates in the earlier described manner to process the write access request. However, for a speculative write access request, the write access request cannot be forwarded to the store buffer 140 until the processor core subsequently confirms that that write access request should take place. However, in accordance with embodiments of the present invention, rather than continuing to occupy one of the slots 150, the attributes associated with such a speculative write access request are forwarded, following the check procedure, to one of the write entries 160, assuming one of those write entries is available, and the original identifier used for that pending write access request is also transferred to the relevant write entry. At this point, the relevant slot can be freed for use with subsequent access requests.

When the subsequent speculative confirmed or speculative failed signal is received by the data cache 30 from the processor core 20, that signal will be accompanied by the ID originally associated with that pending write access request, and this will enable the LSU 100 to forward that signal to the relevant write entry. In the event that a speculative confirmed signal is received, the relevant write entry can at that time forward the attributes of the write access request to the store buffer 140 to enable the write access request to proceed in the usual manner. In the event that a speculative failed signal is received, the pending write access request in the relevant write entry can be killed at that time, and the relevant write entry freed for use with subsequent speculative write access requests. In addition, the ID management circuitry 155 is contacted so that the ID that had been associated with that killed access request is released for use with subsequent access requests.

Figure 3:
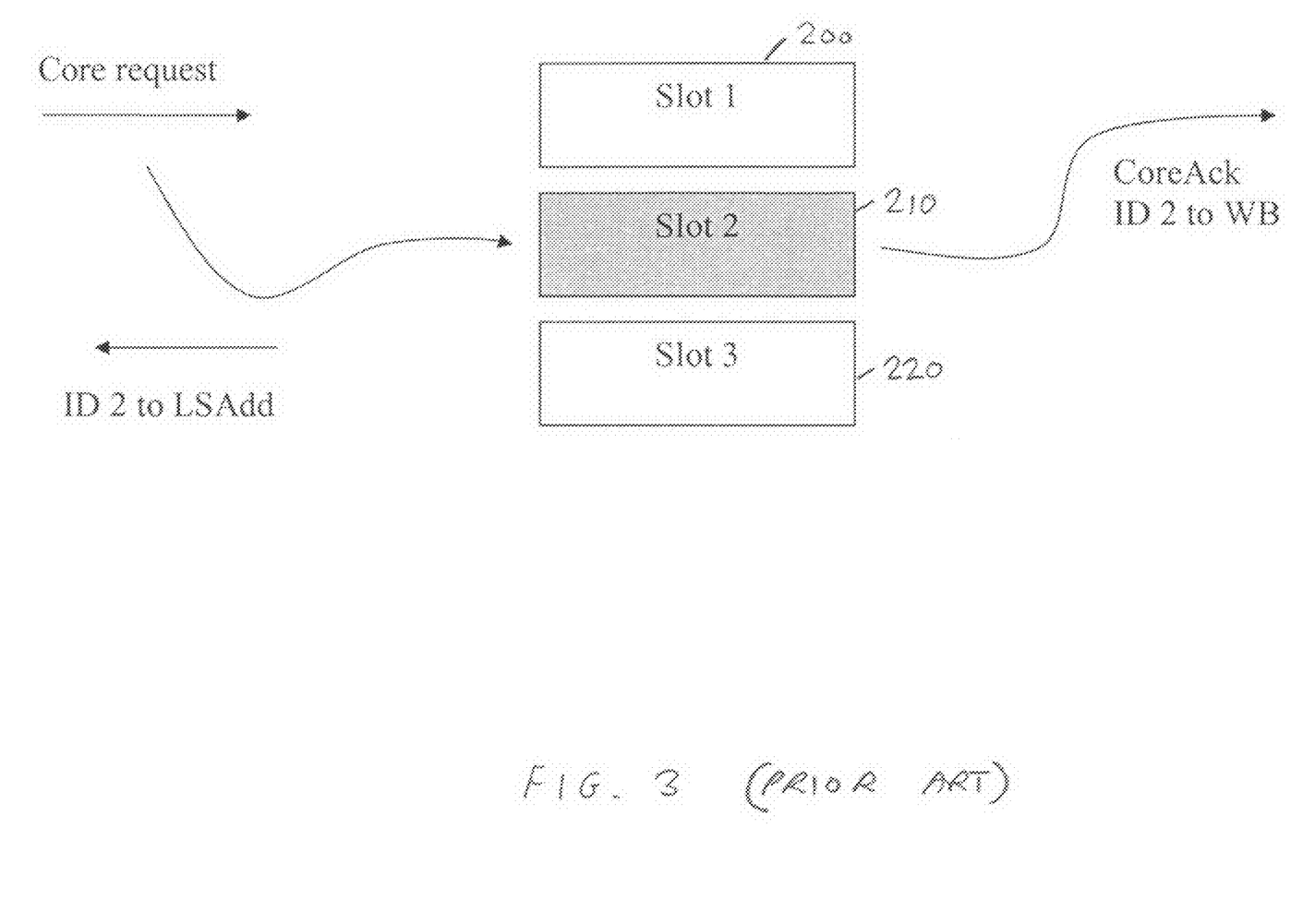
FIG. 3 is a diagram schematically illustrating the use of slots within the load store unit of a data cache in accordance with a known prior art technique.

FIG. 3 is a diagram schematically illustrating the handling of access requests in a typical prior art data cache having three slots. In accordance with the prior art technique, a predetermined ID is associated with each slot, and in this example slot one 200 has ID 1, slot two 210 has ID 2 and slot three 220 has ID 3. When an access request is received from the processor core 20, it is allocated to an available slot, in the example of FIG. 3 the access request being allocated to slot two 210. At this time, the address provided in the access request is stored in slot two, and ID 2 is returned to an LSAdd pipeline stage of the processor core to identify that ID 2 should be used for any subsequent communication between the processor core and the data cache concerning that pending access request. Hence, in due course the core will provide the write data and will issue the ID 2 signal in association with that write data, so that that write data is stored in slot two 210. Once the required checks have been performed, and assuming it is determined that the write access is allowed to proceed, then a normal, non-speculative, write access request can at that point be forwarded to the store buffer 140, at which point an acknowledgement signal will be issued to the writeback (WB) pipeline stage of the core along with the ID 2 signal to identify to the processor core which pending write access request is being acknowledged. If such a prior art technique were to be used for speculative write access requests, then that speculative write access request would need to be retained in slot two 210 until either the speculative confirmed signal or the speculative failed signal is received from the processor core. Only once the speculative confirmed signal has been received would the request be able to be forwarded from slot two 210 to the store buffer 140, at which time the core acknowledgement signal could be issued to the WB stage of the pipeline. Clearly if speculative write access requests are handled in this manner, this could lead to the slot resources being held up for a prolonged period handling speculative write access requests, which would inhibit the ability of the cache to receive subsequent access requests from the processor core, and therefore would impact the processing speed of the processor core.

Figure 4:
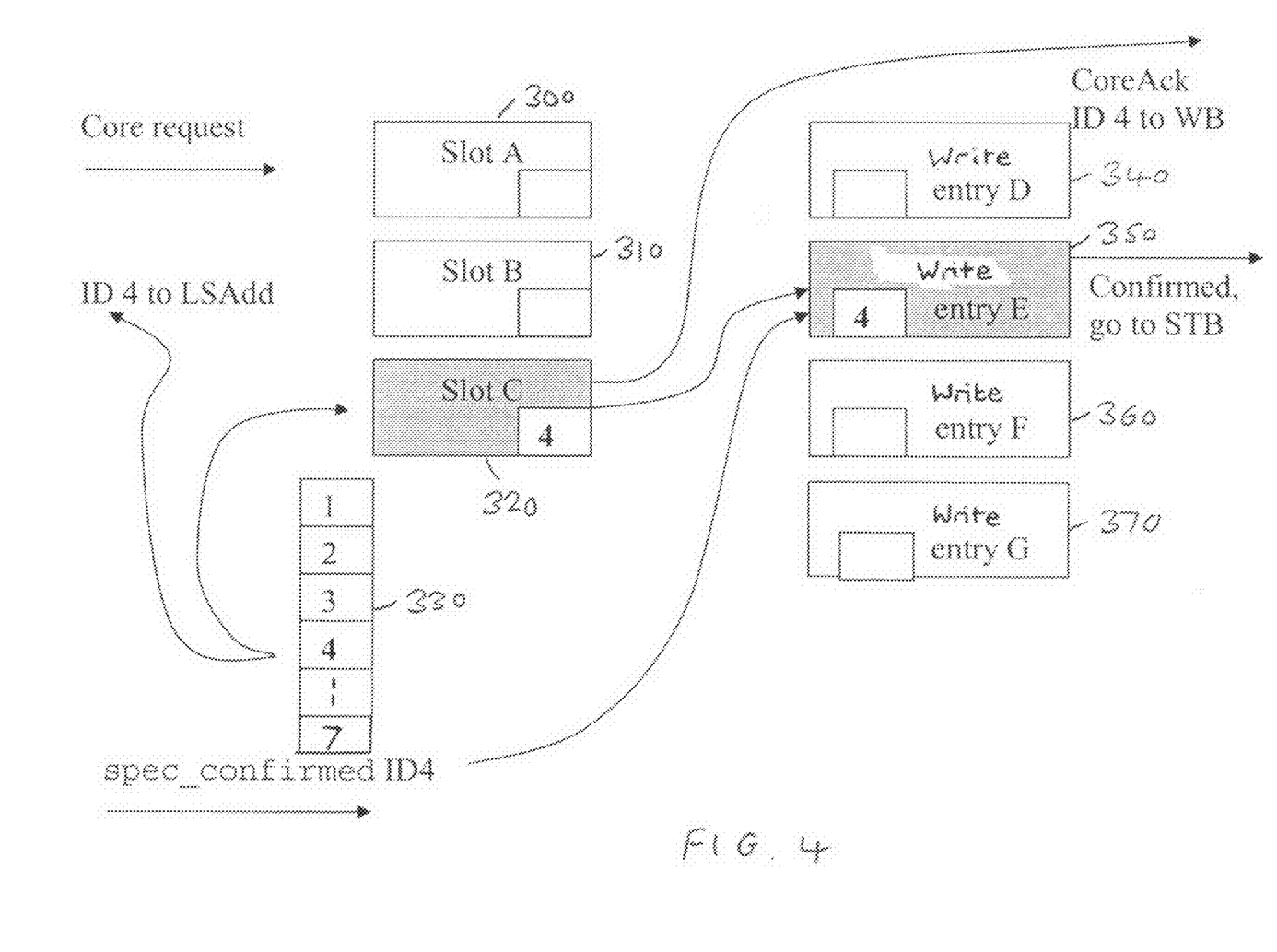
FIG. 4 is a diagram schematically illustrating the use of slots and write entries within the load store unit of the data cache of FIG. 2 in accordance with one embodiment of the present invention.

FIG. 4 illustrates how the combination of the slots and write entries are used in accordance with embodiments of the present invention to handle speculative write access requests. As with the illustrated prior art technique in FIG. 3, three slots 300, 310, 320 are provided, each slot being able to receive a pending write access request or a pending read access request. As with the prior art technique, when an access request is received from the core, then assuming there is an available slot, that access request is allocated to that available slot and the associated address information is stored therein. However, in accordance with embodiments of the present invention, the slots do not have predetermined IDs, and instead the ID management circuitry 155 maintains a list 330 of IDs, that list indicating for each ID whether that ID is currently available to be used for a pending access request. Accordingly, in the example illustrated in FIG. 3, it is determined that ID 4 is currently available, and accordingly when the access request is stored in slot C 320, the ID 4 is chosen by the ID management circuitry 155 and that ID 4 is stored within slot C 320. Further, a signal is returned to the LSAdd pipeline stage of the processor core to identify that ID 4 should be used for subsequent communications concerning that access request.

Once the necessary checks have been performed, and assuming it is determined that the access request can proceed, then an acknowledge signal is issued to the WB stage of the processor core specifying ID 4 to identify to the processor core which pending access request is being acknowledged. For a read access request, the lookup procedure will at this point be performed with reference to the cache array 120, and for a write access request that is non-speculative, the access request will be issued to the store buffer 140 at this point, thereby freeing slot 320 for use with a subsequent access request. However, for a speculative write access request, it is likely that at this point the processor core will not have confirmed whether that speculative access request should proceed or not. Accordingly, at this point the attributes of the access request are forwarded to an available write entry within a write access buffer. In the example illustrated in FIG. 4, there are four write entries 340, 350, 360, 370 and write entry 350 is identified as an available write entry. Accordingly, the attributes of the access request are copied from slot 320 to the write entry 350, and in addition the ID 4 is copied over to the write entry 350. At this point the slot 320 can be released for use in connection with subsequent access requests even though the speculative write access request cannot yet be forwarded to the store buffer 140.

If a speculative confirmed signal is subsequently received from the processor core 20 specifying ID 4, then this speculative confirmed signal is routed to the write entry 350, at which point the write entry 350 outputs the attributes of the access request to the store buffer 140, whereafter the write access request is handled in the usual way. At this point, the write entry can be released to be used for subsequent speculative write access requests, and the ID 4 can be released for allocation to subsequent access requests.

Figure 5A:
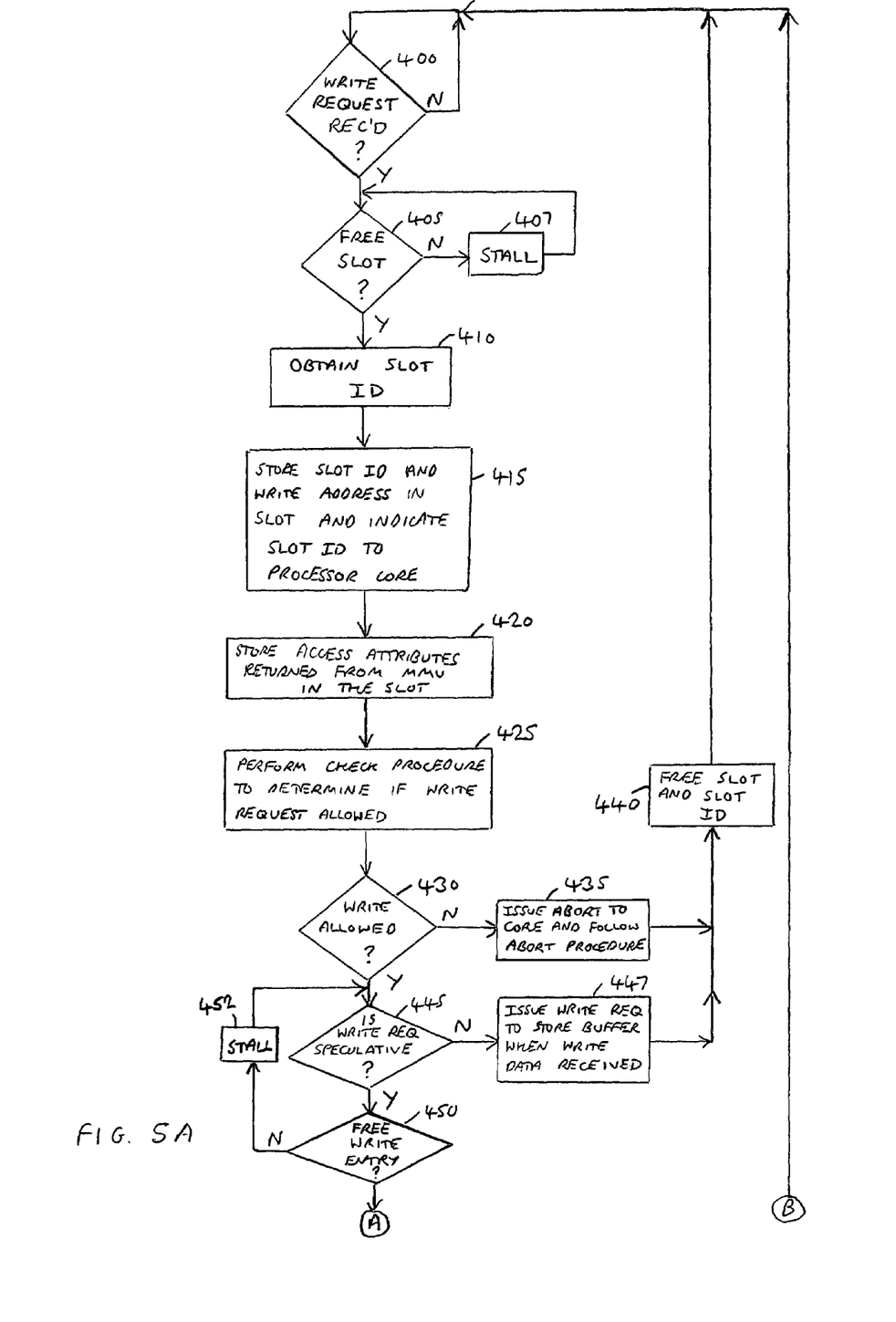
FIGS. 5A and 5B provide a flow diagram illustrating the manner in which write access requests are handled by the data cache of FIG. 2 in accordance with one embodiment of the present invention.
Figure 5B:
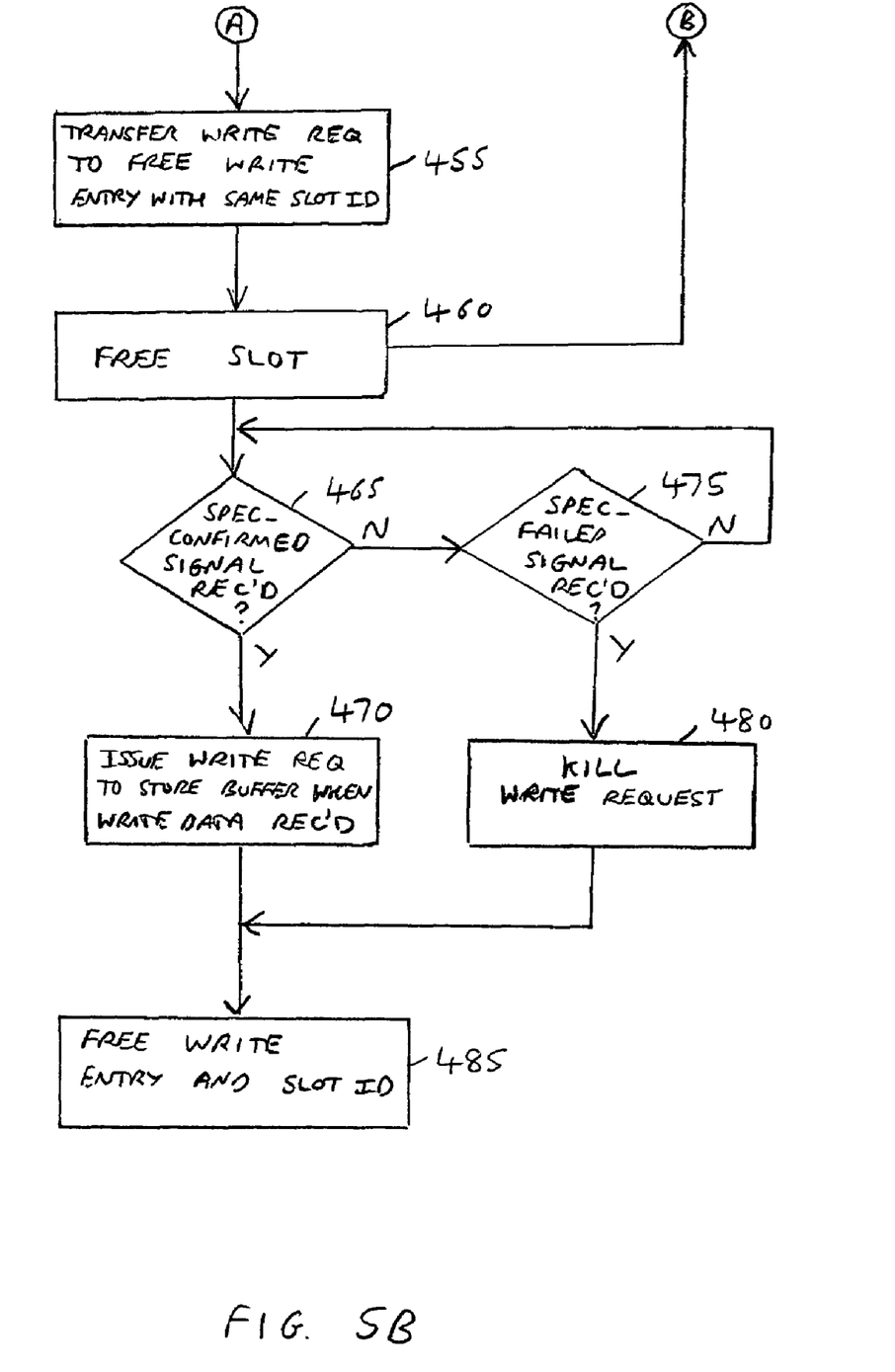

FIGS. 5A and 5B provide a flow diagram illustrating the operations performed by the LSU 100 of FIG. 2 in order to process write access requests in accordance with one embodiment of the present invention. At step 400, receipt of a write access request is awaited, and when such a write access request is received, it is determined at step 405 whether there is a free slot for that write access request. If not, the process stalls at step 407 for a predetermined time, whereafter it is again determined at step 405 whether there is a free slot. Once a free slot has been identified, then a slot ID is obtained at step 410 from the ID manager circuitry 155. Thereafter, at step 415, the slot ID and write address are stored in the allocated slot and an indication of that slot ID is returned to the processor core 20.

Further, at step 420, the access attributes output by the μ-TLB 175 of the MMU 120 are stored in the allocated slot, and then at step 425 a check procedure is performed to determine if the write request is allowed. If at step 430, it is determined that the write access request is not allowed, then the process branches to step 435, where an abort is issued to the processor core 20 and an abort procedure is followed by the LSU 100. The abort procedure can take a variety of forms, but in one embodiment, when a slot receives an abort, it stops ("blocks") the operation of all slots that are newer than it. The slots that are older than it continue operating normally. When the aborted slot becomes the oldest slot, it signals the abort to the processor core 20. In the meantime, the aborted slot updates a Fault Status Register (FSR) and a Fault Address Register (FAR). The newer slots are still blocked, and they wait for a "flush" signal from the processor core. A few cycles later (due to the time taken for the processor core to recover), the flush signal is sent by the processor core, and it has the effect of clearing everything pending in the LSU 100. Then the processor core starts sending access requests again.

Following step 435, the process proceeds to step 440, where the allocated slot and the slot ID are freed for use in connection with subsequent access requests. Thereafter, the process returns to step 400.

Returned to step 430, if it is determined that the write access request is allowed, it is then determined at step 445 whether the write request is a speculative write request. If not, the process proceeds to step 447, where the write request is issued to the store buffer 140 when the write data has been received from the processor core. As mentioned previously, the write data typically follows several cycles after the initial access request. Thereafter, the process proceeds to step 440, where the allocated slot and slot ID are freed for use in connection with subsequent access requests, whereafter the process returns to step 400.

If at step 445 it is determined that the write access request is speculative, then the process proceeds to step 450, where it is determined whether there is a free write entry for receiving that speculative write access request. If not, the process returns to step 445 following a stall at step 452, where it is again determined whether the write access request is speculative. This is rechecked since in the intervening period it is possible that the speculative confirmed signal may have been received from the processor core 20, and if so the write request no longer needs to be considered as a speculative write access request, and instead can be considered as a standard, non-speculative, access request, allowing the process to proceed to step 447.

However, if for a speculative write access request it is determined at step 450 that there is a free write entry, then the process proceeds to step 455, where the write request is transferred to the free write entry along with the same slot ID. Thereafter, at step 460, the allocated slot is freed for use in a subsequent access request. At this point, the process can return to step 400 to enable the slot to be used in connection with subsequent access requests. In addition, the process proceeds to step 465, where it is determined whether a speculative confirmed signal has been received from the processor core. If not, it is determined whether a speculative failed signal has been received from the processor core at step 475. If neither signal has been received, then following an appropriate delay, the process returns to step 465 to again look for the presence of either of these two signals.

If a speculative confirmed signal is received at step 465, then the write request is issued at step 470 to the store buffer 140 after the write data has been received. It is typically expected that the write data will already have been received by this point, and will have been stored within the write entry, but if not the write request will only be issued to the store buffer once the write data has been received. Following step 470, the write entry and slot ID can be freed at step 485 for use in connection with subsequent access requests.

If at step 475 it is determined that a speculative failed signal has been received, then the write request is killed at step 480 and thereafter at step 485 the write entry and slot ID are freed for use in connection with subsequent access requests.

From the above description of embodiments of the present invention, it will be appreciated that such embodiments allow the use of a write access buffer for speculative write accesses inside the LSU, without a need to change the logic of the processor core. In particular, the processor core does not need to know if the access request is stored inside one of the slots or inside an entry of the write access buffer. Instead, the processor core merely continues to act in the standard manner to in due course send either the speculative failed or the speculative confirmed signals, along with a slot ID associated with that access request. In accordance with the techniques of embodiments of the present invention, space is provided within the LSU for retaining speculative write access requests, but with less area than would be required if additional slots were provided, and without adversely affecting timing (as would be the case if more slots were provided, and accordingly the associated arbitration circuitry and other control circuitry were of increased complexity). The control logic associated with each slot is used to perform the μ-TLB lookup and to check protection faults, and when this is done, and assuming no faults are detected, an acknowledgement can be sent to the core. Then, if the slot contains a speculative write access request, that write access request is passed to the write access buffer. The entries in the write access buffer do not need to have all of the μ-TLB and acknowledgement logic, as these operations have already been done whilst the access request was stored in one of the slots. Further, the presence of the write entries does not increase the complexity of the arbitration logic required in connection with the slots since the write entries do not communicate with any of the other components of the cache other than the store buffer 140 and the hazard detection circuitry.

The slots and write entries need to be provided with a mechanism for storing the ID, since that ID is dynamically allocated to an access request at the time that access request is accepted as a pending access request by the cache. However, such IDs can be stored in a data flip flop (DFF), which can easily be implemented within such slots and write entries.

In accordance with the embodiments of the present invention, the presence of the write access buffer is entirely transparent to the processor core, which avoids any increase in complexity in the operation of the processor core.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Cache circuitry for use in a data processing apparatus, the cache circuitry comprising:
    a cache storage comprising a plurality of cache lines for storing data values for access by a device of the data processing apparatus;
    a plurality of slots, each slot arranged to store attributes associated with a pending access request issued by said device, each pending access request being either a write access request or a read access request;
    identifier circuitry for maintaining a record of identifiers that are available to associate with pending access requests to uniquely identify each pending access request;
    control circuitry, responsive to an access request issued by said device, to accept that access request as a pending access request by allocating one of said plurality of slots to that access request, obtaining from the identifier circuitry one of said identifiers to associate with that access request, and causing the attributes associated with that access request to be stored in the allocated slot along with the obtained identifier;
    the control circuitry being arranged to perform a check procedure to determine, for each pending access request, whether that access request is allowed to proceed;
    a write access buffer comprising a plurality of write entries; for a speculative pending write access request seeking to write data, the control circuitry being responsive to a determination that that pending access request is allowed to proceed to transfer from the allocated slot to one of said write entries the identifier associated with that access request and at least the attributes associated with that access request that are required to enable the access request to be completed, and to then free the allocated slot for allocation to a subsequent access request;
    the write access buffer being responsive to a speculative confirmed signal from the device specifying said identifier, to output the attributes from the write entry having that identifier to store circuitry used to complete the access request.

2. Cache circuitry as claimed in claim 1, wherein for a write access request the attributes that are stored in the allocated slot at the time that access request is accepted as a pending access request comprise at least an address indication identifying a memory address of a data value to be written.

3. Cache circuitry as claimed in claim 2, wherein the attributes stored in the allocated slot further comprise access attributes output by a memory access attribute unit of the data processing apparatus, the access attributes being dependent on the memory address specified by the pending access request.

4. Cache circuitry as claimed in claim 3, wherein when performing the check procedure the control circuitry references the access attributes stored in the allocated slot.

5. Cache circuitry as claimed in claim 1, wherein following acceptance of a write access request as a pending access request, the control circuitry is responsive to receipt from the device of write data associated with that write access request to determine from the identifier provided with that write data whether the attributes of that pending access request are currently stored in one of said slots or within one of said write entries, and to forward the write data to the relevant slot or write entry for storing therein as one of said attributes.

6. Cache circuitry as claimed in claim 1, wherein for a non-speculative pending write access request, the control circuitry is responsive to a determination that that pending access request is allowed to proceed to output the attributes from the allocated slot to the store circuitry used to complete the access request.

7. Cache circuitry as claimed in claim 1, wherein once the attributes of a pending write access request have been output to the store circuitry, the identifier circuitry is updated to enable the identifier that had been associated with that pending write access request to be associated with a subsequent pending access request.

8. Cache circuitry as claimed in claim 1, wherein the control circuitry is responsive to a speculative failed signal from the device specifying said identifier, to kill the pending write access request associated with that identifier, and to cause the write entry or allocated slot storing the attributes of that pending write access request to be freed for use with a subsequent pending access request.

9. Cache circuitry as claimed in claim 8, wherein responsive to the speculative failed signal the identifier circuitry is updated to enable the identifier that had been associated with that pending write access request to be associated with a subsequent pending access request.

10. Cache circuitry as claimed in claim 1, wherein if the speculative confirmed signal is received from the device before the attributes of the pending write access request have been transferred from the allocated slot to one of said write entries, the control circuitry is arranged to cause the attributes to be output from the allocated slot to the store circuitry instead of being transferred to the write entry.

11. A data processing apparatus comprising:
- a processing unit operable to perform data processing operations requiring access to data values stored in memory;
- cache circuitry operable to store a subset of said data values for access by the processing unit, the cache circuitry comprising:
- a cache storage comprising a plurality of cache lines for storing said subset of data values;
- a plurality of slots, each slot arranged to store attributes associated with a pending access request issued by said processing unit, each pending access request being either a write access request or a read access request;
- identifier circuitry for maintaining a record of identifiers that are available to associate with pending access requests to uniquely identify each pending access request;
- control circuitry, responsive to an access request issued by said processing unit, to accept that access request as a pending access request by allocating one of said plurality of slots to that access request, obtaining from the identifier circuitry one of said identifiers to associate with that access request, and causing the attributes associated with that access request to be stored in the allocated slot along with the obtained identifier;
- the control circuitry being arranged to perform a check procedure to determine, for each pending access request, whether that access request is allowed to proceed;
- a write access buffer comprising a plurality of write entries;
- for a speculative pending write access request seeking to write data, the control circuitry being responsive to a determination that that pending access request is allowed to proceed to transfer from the allocated slot to one of said write entries the identifier associated with that access request and at least the attributes associated with that access request that are required to enable the access request to be completed, and to then free the allocated slot for allocation to a subsequent access request;
- the write access buffer being responsive to a speculative confirmed signal from the processing unit specifying said identifier, to output the attributes from the write entry having that identifier to store circuitry used to complete the access request.

12. A data processing apparatus as claimed in claim 11, wherein the processing unit is a processor core and the cache circuitry is a level 1 cache associated with the processor core.

13. Cache logic for use in a data processing apparatus, the cache logic comprising:
- cache storage means comprising a plurality of cache lines for storing data values for access by a device of the data processing apparatus;
- a plurality of slot means, each slot means for storing attributes associated with a pending access request issued by said device, each pending access request being either a write access request or a read access request;
- identifier means for maintaining a record of identifiers that are available to associate with pending access requests to uniquely identify each pending access request;
- control means, responsive to an access request issued by said device, for accepting that access request as a pending access request by allocating one of said plurality of slot means to that access request, obtaining from the identifier means one of said identifiers to associate with that access request, and causing the attributes associated with that access request to be stored in the allocated slot means along with the obtained identifier;
- the control means further for performing a check procedure to determine, for each pending access request, whether that access request is allowed to proceed;
- a write access buffer means comprising a plurality of write entry means;
- for a speculative pending write access request seeking to write data, the control means being responsive to a determination that that pending access request is allowed to proceed for transferring from the allocated slot means to one of said write entry means the identifier associated with that access request and at least the attributes associated with that access request that are required to enable the access request to be completed, and to then free the allocated slot means for allocation to a subsequent access request;
- the write access buffer means being responsive to a speculative confirmed signal from the device specifying said identifier, for outputting the attributes from the write entry means having that identifier to store means used to complete the access request.

14. A method of handling write requests within cache circuitry of a data processing apparatus, the cache circuitry having a cache storage comprising a plurality of cache lines for storing data values for access by a device of the data processing apparatus, the method comprising the steps of:
- maintaining a plurality of slots, each slot arranged to store attributes associated with a pending access request issued by said device, each pending access request being either a write access request or a read access request;
- maintaining a record of identifiers that are available to associate with pending access requests to uniquely identify each pending access request;
- responsive to an access request issued by said device, accepting that access request as a pending access request by allocating one of said plurality of slots to that access request, obtaining from said record one of said identifiers to associate with that access request, and storing the attributes associated with that access request in the allocated slot along with the obtained identifier;
- performing a check procedure to determine, for each pending access request, whether that access request is allowed to proceed;
- maintaining a write access buffer comprising a plurality of write entries;
- for a speculative pending write access request seeking to write data, responding to a determination that that pending access request is allowed to proceed by transferring from the allocated slot to one of said write entries the identifier associated with that access request and at least the attributes associated with that access request that are required to enable the access request to be completed, and then freeing the allocated slot for allocation to a subsequent access request; and
- responsive to a speculative confirmed signal from the device specifying said identifier, outputting the attributes from the write entry having that identifier to store circuitry used to complete the access request.

* * * * *